United States Patent
Bavaria et al.

(10) Patent No.: US 7,752,485 B2
(45) Date of Patent: Jul. 6, 2010

(54) METHOD AND SYSTEM FOR VIRTUAL REMOVAL OF PHYSICAL FIELD REPLACEABLE UNITS

(75) Inventors: Priti Bavaria, Austin, TX (US); Pradeep K. Errammagari, Bangalore (IN); Kanisha Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 11/840,592

(22) Filed: Aug. 17, 2007

(65) Prior Publication Data

US 2009/0049330 A1    Feb. 19, 2009

(51) Int. Cl.
*G06F 11/00* (2006.01)
(52) U.S. Cl. ............................................. 714/2; 714/3
(58) Field of Classification Search ................ 714/2, 714/3
See application file for complete search history.

(56) References Cited

U.S. PATENT DOCUMENTS

| 5,664,119 | A  | * | 9/1997  | Jeffries et al. ............... 710/302 |
| 6,158,015 | A  | * | 12/2000 | Klein ............................. 714/2 |
| 6,247,080 | B1 | * | 6/2001  | Wallach et al. ............... 710/302 |
| 6,523,140 | B1 | * | 2/2003  | Arndt et al. .................. 714/44 |
| 6,904,546 | B2 | * | 6/2005  | Wu et al. ...................... 714/44 |
| 7,523,359 | B2 | * | 4/2009  | Richards et al. .............. 714/49 |
| 2003/0126498 | A1 | * | 7/2003 | Bigbee et al. ................. 714/10 |
| 2004/0078634 | A1 | * | 4/2004 | Gilstrap et al. ................ 714/5 |
| 2006/0230306 | A1 | * | 10/2006 | Richards et al. .............. 714/7 |

* cited by examiner

*Primary Examiner*—Marc Duncan
(74) *Attorney, Agent, or Firm*—Dillon & Yudell LLP

(57) ABSTRACT

A method of virtually removing field replaceable units (FRUs) from a computer system during concurrent maintenance operations. Firmware within a flexible service processor (FSP) assigns unique resource identification (RID) numbers to each FRU in the computer system. The firmware collects vital product data (VPD) for each FRU and generates a duplicate test shared library, which is stored in a memory directory corresponding to the FSP. When the firmware receives input from a graphical user interface (GUI) that includes at least a first FRU selected for virtual removal from the computer system, the firmware adds the RID number of the selected FRU to the memory directory and recollects VPD. The FSP subsequently ignores any FRUs corresponding to RID numbers stored in the memory directory during operation of the computer system.

3 Claims, 4 Drawing Sheets

METHOD AND SYSTEM FOR VIRTUAL REMOVAL OF PHYSICAL FIELD REPLACEABLE UNITS

BACKGROUND OF THE INVENTION

1. Technical Field

The present invention relates in general to computers and in particular to an improved method and system for virtually removing hardware while a computer system is running.

2. Description of the Related Art

Operating errors often occur in computer hardware. These hardware-based operating errors typically result in a period of time, referred to as computer downtime, in which the computer is unavailable for use. For multi-user (or clustering computing environment) computers, such as mainframe computers, midrange computers, supercomputers, and network servers, the inability to use a particular computer may have a significant impact on the productivity of a large number of users, particularly if an error impacts mission-critical applications (e.g., when processing bank transactions). Multi-user computers are typically used around the clock, and as a result, it is critically important that these computers be accessible as much as possible.

Hardware concurrent maintenance is utilized to address the problems associated with computer downtime. Hardware concurrent maintenance is a process of performing maintenance on computer hardware, while the computer is running, thereby resulting in minimal impact to user accessibility. Conventional hardware concurrent maintenance typically requires that maintenance personnel physically remove one or more field replaceable units (FRUs) from a computer system. FRUs may be packaged in a very complex fashion and/or require special tools to enable removal without causing hardware damage. Furthermore, function verification test (FVT) procedures performed on removed FRUs can expend valuable time and labor resources.

SUMMARY OF AN EMBODIMENT

Disclosed are a method, system, and computer program product for virtually removing field replaceable units (FRUs) from a computer system during concurrent maintenance operations. Firmware within a flexible service processor (FSP) assigns unique resource identification (RID) numbers to each FRU in the computer system. The firmware collects vital product data (VPD) for each FRU and generates a duplicate test shared library, which is stored in a memory directory corresponding to the FSP. When the firmware receives input from a graphical user interface (GUI) that includes at least a first FRU selected for virtual removal from the computer system, the firmware adds the RID number of the selected FRU to the memory directory and recollects VPD. The FSP subsequently ignores any FRUs corresponding to RID numbers stored in the memory directory during operation of the computer system.

Virtual removal of FRUs minimizes the potential for physical damage to computer hardware and eliminates the need for special removal tools, since the virtually removed FRUs are still physically present in the computer system. The present invention also eliminates the need for specialized hardware removal personnel and increases the efficiency of concurrent maintenance.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and system for virtually removing field replaceable units (FRUs) from a computer system during concurrent maintenance operations. As utilized herein, a FRU is defined as a separate entity (e.g., a central electronics complex (CEC) entity) that can be replaced in a service action performed on the computer system. During a service action, a user can thus replace one or more single physical pieces of packaging (i.e., a FRU, or a package containing multiple smaller FRUs) to fix a particular problem. As utilized herein, virtual removal is defined as the simulated removal of a FRU that is still physically present in a computer system. A user may virtually remove a FRU for firmware development, functional verification test (FVT), and/or debugging purposes.

Figure 1:
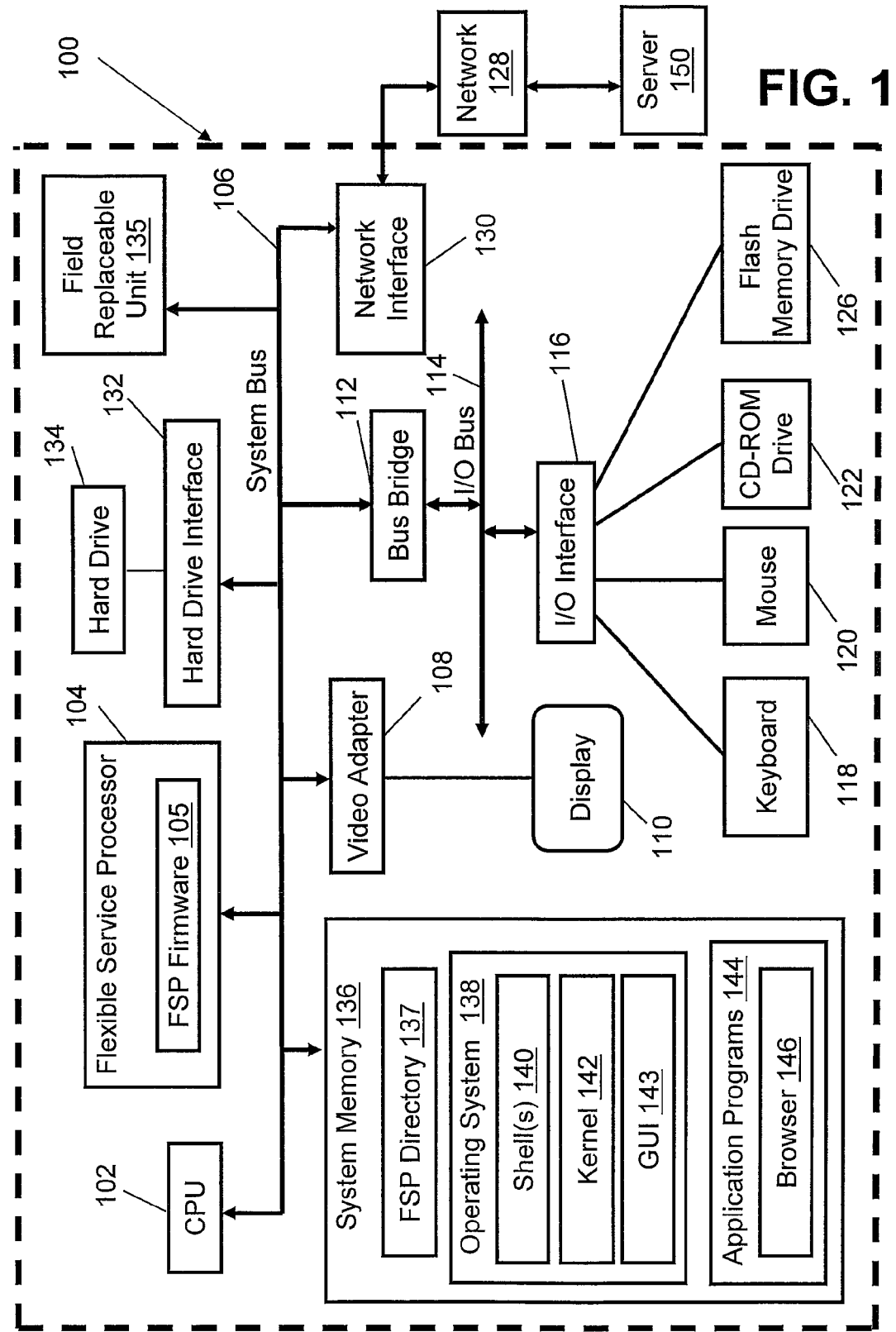
FIG. 1 depicts a high level block diagram of an exemplary computer, according to an embodiment of the present invention.

With reference now to FIG. 1, there is depicted a block diagram of an exemplary computer 100, with which the present invention may be utilized. Computer 100 includes central processing unit (CPU) 102, which is coupled to system bus 106. Computer 100 also includes flexible service processor (FSP) 104, which is coupled to system bus 106. An exemplary FRU 135 is also coupled to system bus 106. FSP 104 includes FSP firmware 105. FSP firmware 105 allocates processing load to one or more FRUs during system simulations and/or tests according to the processes illustrated in FIGS. 3-4, which are discussed below.

Video adapter 108, which drives/supports display 110, is also coupled to system bus 106. System bus 106 is coupled via bus bridge 112 to Input/Output (I/O) bus 114. I/O interface 116 is coupled to I/O bus 114. I/O interface 116 affords communication with various I/O devices, including keyboard 118, mouse 120, Compact Disk-Read Only Memory (CD-ROM) drive 122, and flash memory drive 126. The format of the ports connected to I/O interface 116 may be any known to those skilled in the art of computer architecture, including but not limited to Universal Serial Bus (USB) ports. In an alternate embodiment, FSP 104 and/or FRU 135 may be coupled to I/O bus 114.

Computer 100 is able to communicate with server 150 via network 128 using network interface 130, which is coupled to system bus 106. Network 128 may be an external network such as the Internet, or an internal network such as a Local Area Network (LAN), an Ethernet, or a Virtual Private Network (VPN). In one embodiment, server 150 is configured similarly to computer 100.

Figure 2:
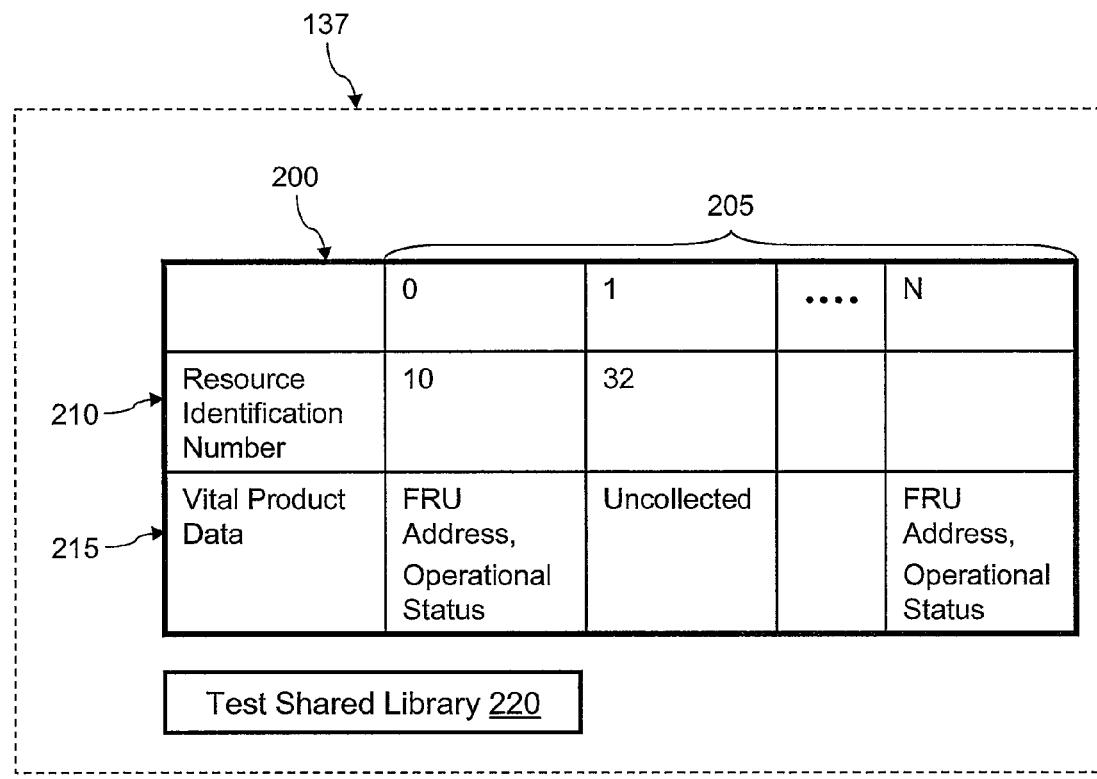
FIG. 2 is a high level block diagram of an exemplary flexible service processor (FSP) directory, according to an embodiment of the present invention.

Hard drive interface 132 is also coupled to system bus 106. Hard drive interface 132 interfaces with hard drive 134. In one embodiment, hard drive 134 populates system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Data that populates system memory 136 includes FSP directory 137, Operating System (OS) 138, and application programs 144. FSP directory 137 includes data corresponding to one or more FRUs, as illustrated in FIG. 2, which is discussed below.

OS 138 includes shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes Graphical User Interface (GUI) 143 and kernel 142, which includes lower levels of functionality for OS 138. Kernel 142 provides essential services required by other parts of OS 138 and application programs 144. The services provided by kernel 142 include memory management, process and task management, disk management, and I/O device management. FSP firmware 105 provides a GUI using display 110 and enables a user of computer 100 to select one or more FRUs for virtual removal and/or restoration according to the processes illustrated in FIGS. 3-4, which are discussed below.

Application programs 144 include browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

With reference now to FIG. 2, there is depicted a high level block diagram of an exemplary FSP directory, according to an embodiment of the present invention. As shown, FSP directory 137 includes FRU data table 200 and test shared library 220, which includes information corresponding to FRUs eligible for FVT. FRU data table 200 includes N data columns 205, where N is an integer corresponding to the number of FRUs within computer 100. Data columns 205 thus each include data that corresponds to a different FRU. FRU data table 200 includes a data field for resource identification (RID) number 210. As utilized herein, an RID refers to a unique identification number that corresponds to a FRU. According to the illustrative embodiment, FRU data table 200 includes RID numbers 210 that correspond to FRUs selected for virtual removal from computer 100 via the process illustrated in FIG. 3, which is discussed below.

FRU data table 200 also includes a data field for vital product data (VPD) 215. VPD 215 may include FRU address information, FRU operational status information, and the like. According to the illustrative embodiment, VPD 215 includes a placeholder value (e.g., "uncollected") if FSP firmware 105 has not collected information corresponding to one or more specific FRUs. In one embodiment, test shared library 220 may include backup information (e.g., the last known valid state of each FRU in computer 100) that enables FSP firmware 105 to perform FVT on FRUs and/or to virtually restore previously-removed FRUs after FVT.

Figure 3:
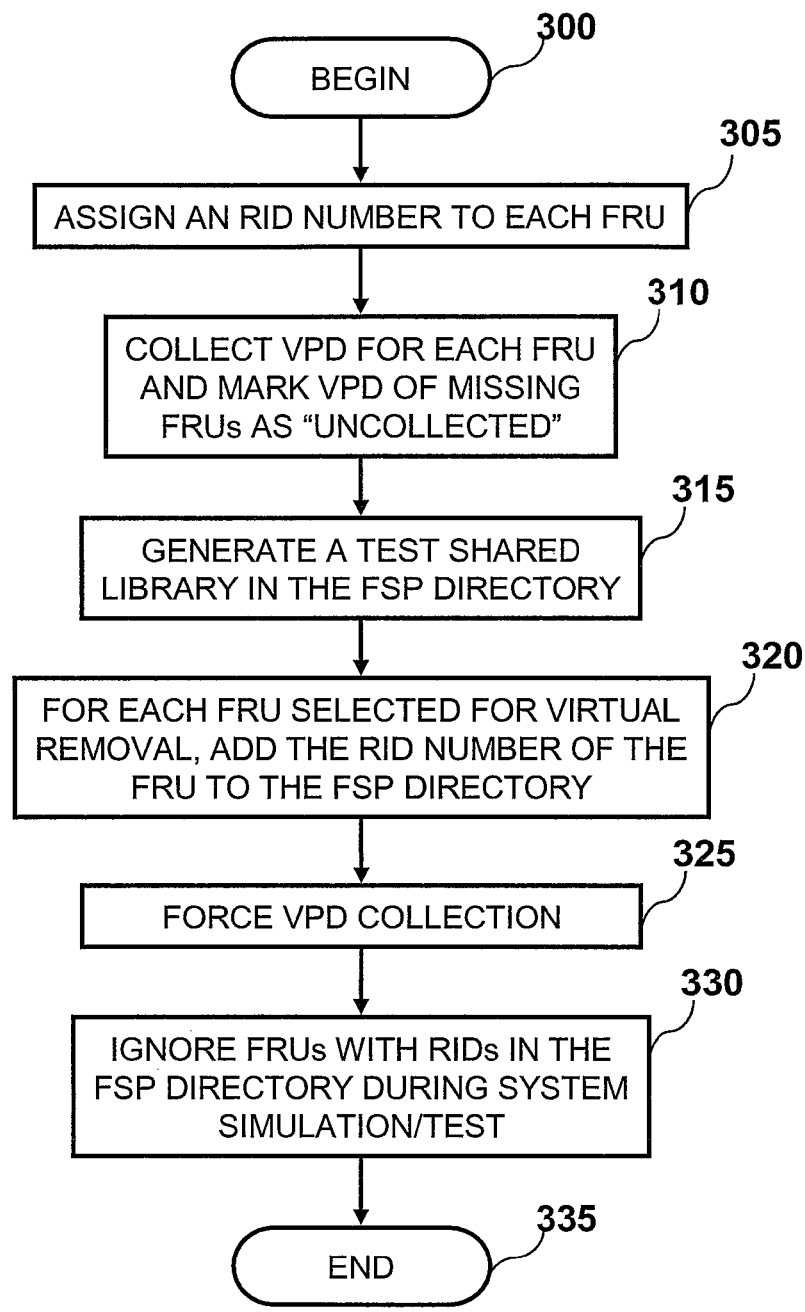
FIG. 3 is a high level logical flowchart of an exemplary method of virtually removing a field replaceable unit (FRU) from a computer system, according to an embodiment of the invention.

With reference now to FIG. 3, there is illustrated a high level logical flowchart of an exemplary method of virtually removing a FRU from a computer system, according to an embodiment of the invention. The process begins at block 300 in response to a user of computer 100 using a GUI provided by FSP firmware 105 to select one or more FRUs 135 for virtual removal. For example, the GUI may provide a window with a list of available FRUs and multiple toggle buttons that correspond to each FRU. A user may then use the toggle buttons to select one or more FRUs for virtual removal. FSP firmware 105 assigns unique RID numbers 210 to each FRU in computer 100, as depicted in block 305. FSP firmware 105 collects VPD 215 for each FRU in computer 100, as shown in block 310. If FSP firmware 105 is unable to collect VPD 215 for a specific FRU, FSP firmware 105 marks VPD 215 as "uncollected" for the specific FRU. FSP firmware 105 generates a new test shared library 220 (i.e., a duplicate library that enables the original library to remain unaffected) and stores the duplicate test shared library 220 in FSP directory 137, as depicted in block 315.

According to the illustrative embodiment, a user of computer 100 uses a GUI to select one or more FRUs for virtual removal, and FSP firmware 105 adds RID numbers 210 of the selected FRUs to FRU data table 200 within FSP directory 137, as shown in block 320. In an alternate embodiment, FRU data table 200 may instead include only RID numbers 210 of FRUs not selected for virtual removal. FSP firmware 105 subsequently forces collection of VPD, as depicted in block 325. FSP firmware 105 ignores FRUs that have RID numbers 210 stored in FRU data table 200 during any simulation and/or test operations, as shown in block 330. The process subsequently terminates at block 335.

Figure 4:
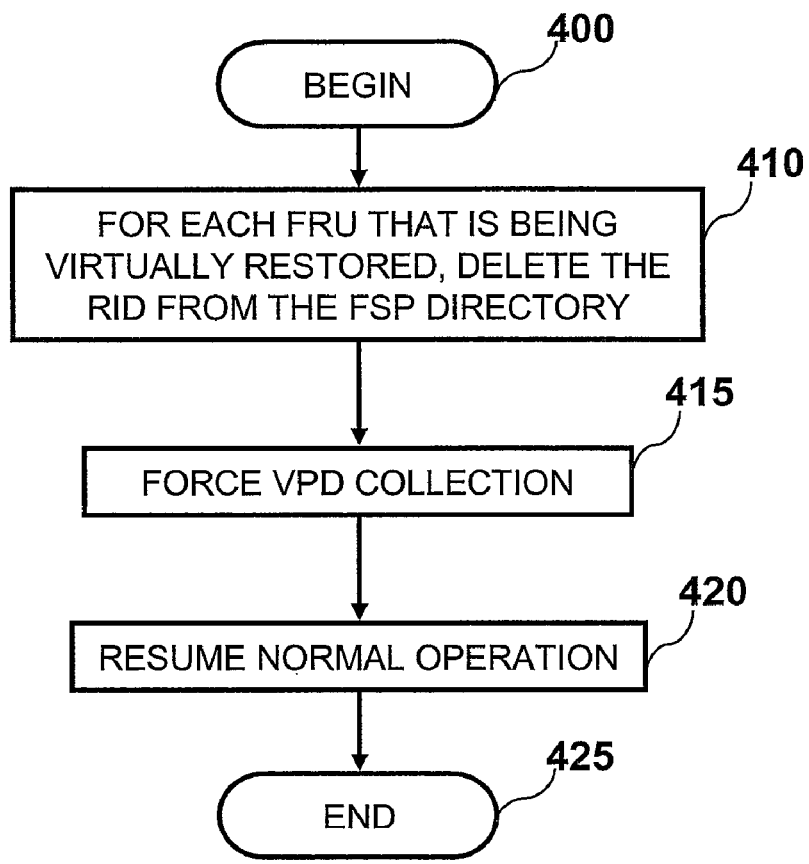
FIG. 4 is a high level logical flowchart of an exemplary method of restoring a virtually-removed FRU in a computer system, according to an embodiment of the invention.

Turning now to FIG. 4, there is illustrated a high level logical flowchart of an exemplary method of restoring a virtually-removed FRU in a computer system, according to an embodiment of the invention. The process begins at block 400 in response to a user of computer 100 concluding a simulation and or test of one or more FRUs 135. According to the illustrative embodiment, a user of computer 100 uses a GUI provided by FSP firmware 105 to delete and/or clear the RID numbers 210 from FSP directory 137 of one or more FRUs that the user would like to virtually restore (i.e., return to normal operation), as shown in block 410. The user subsequently uses a GUI to command FSP firmware 105 to force collection of VPD 215 for one or more FRUs, as depicted in block 415. FSP 104 resumes normal operation (i.e., with all FRUs restored), as shown in block 420, and the process terminates at block 425. In an alternate embodiment, a user may instead press a single button in GUI 143 that may clear all RID numbers 210 from FSP directory 137. In another embodiment, FSP firmware 105 may instead reset FSP 104 automatically after a user uses GUI 143 to delete one or more RID numbers 210 from FSP directory 137.

The present invention thus provides a method for virtually removing FRUs from a computer system during concurrent maintenance operations. Virtual removal of FRUs minimizes the potential for physical damage to computer hardware and eliminates the need for special removal tools, since the virtually removed FRUs are still physically present in the computer system. The present invention also eliminates the need for specialized hardware removal personnel and increases the efficiency of concurrent maintenance.

It is understood that the use herein of specific names are for example only and not meant to imply any limitations on the invention. The invention may thus be implemented with different nomenclature/terminology and associated functionality utilized to describe the above devices/utility, etc., without limitation.

In the flow chart (FIGS. 3-4) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While the invention has been particularly shown and described with reference to a preferred embodiment, it will be understood by those skilled in the art that various changes in form and detail may be made therein without departing from the spirit and scope of the invention.

What is claimed is:

1. A method comprising:
    assigning a unique resource identification (RID) number to each of a plurality of field replaceable units (FRUs) within a computer system;
    collecting vital product data (VPD) for each of said plurality of FRUs;
    generating a duplicate test shared library in a memory directory corresponding to a flexible service processor (FSP) in said computer system, wherein said duplicate test shared library includes information corresponding to said plurality of FRUs;
    receiving input from a graphical user interface (GUI), wherein said input comprises at least a first FRU selected for virtual removal;
    adding the RID number of said first FRU to said memory directory;
    collecting VPD for said first FRU;
    ignoring said first FRU corresponding to said RID number stored in said memory directory during subsequent operation of said computer system; and
    virtually restoring said first FRU in said computer system, wherein said virtually restoring comprises:
        deleting said RID number corresponding to said first FRU from said memory directory; and
        resetting said FSP, wherein only FRUs corresponding to RID numbers in said memory directory are ignored during subsequent operation of said computer system.

2. A computer system comprising:
    a flexible service processor (FSP);
    a plurality of field replaceable units (FRUs) coupled to said FSP;
    a memory coupled to said FSP that includes a memory directory corresponding to said FSP and a graphical user interface (GUI); and
    firmware within said FSP that provides the functions of:
        assigning a unique resource identification (RID) number to each of said plurality of FRUs within a computer system;
        collecting vital product data (VPD) for each of said plurality of FRUs;
        generating a duplicate test shared library in said memory directory that includes information corresponding to said plurality of FRUs;
        receiving input from a graphical user interface (GUI), wherein said input comprises at least a first FRU selected for virtual removal;
        adding the RID number of said first FRU to said memory directory;
        collecting VPD for said first FRU;
        ignoring said first FRU corresponding to said RID number stored in said memory directory during subsequent operation of said computer system; and
    wherein said firmware further provides the functions of virtually restoring said first FRU in said computer system, wherein said means for virtually restoring comprises:
        deleting said RID number corresponding to said first FRU from said memory directory; and
        resetting said FSP, wherein only FRUs corresponding to RID numbers in said memory directory are ignored during subsequent operation of said computer system.

3. A computer program product comprising:
a computer storage medium; and
program code on said computer storage medium that that when executed provides the functions of:
    assigning a unique resource identification (RID) number to each of a plurality of field replaceable units (FRUs) within a computer system;
    collecting vital product data (VPD) for each of said plurality of FRUs;
    generating a duplicate test shared library in a memory directory corresponding to a flexible service processor (FSP) in said computer system, wherein said duplicate test shared library includes information corresponding to said plurality of FRUs;
    receiving input from a graphical user interface (GUI), wherein said input comprises at least a first FRU selected for virtual removal;
    adding the RID number of said first FRU to said memory directory;
    collecting VPD for said first FRU;
    ignoring said first FRU corresponding to said RID number stored in said memory directory during subsequent operation of said computer system; and
    virtually restoring said first FRU in said computer system, wherein said code for virtually restoring comprises code for:
        deleting said RID number corresponding to said first FRU from said memory directory; and
        resetting said FSP, wherein only FRUs corresponding to RID numbers in said memory directory are ignored during subsequent operation of said computer system.

* * * * *